United States Patent
Yang et al.

(10) Patent No.: US 10,880,233 B2
(45) Date of Patent: Dec. 29, 2020

(54) ROUTING MANAGEMENT (71) Applicant: NEW H3C TECHNOLOGIES CO., LTD., Hangzhou (CN)

(72) Inventors: Xiaopeng Yang, Beijing (CN); Min Zheng, Beijing (CN)

(73) Assignee: NEW H3C TECHNOLOGIES CO., LTD., Hangzhou (CN)

(*) Notice: Subject to any disclaimer, the term of this patent is extended or adjusted under 35 U.S.C. 154(b) by 155 days.

(21) Appl. No.: 15/745,081

(22) PCT Filed: Aug. 16, 2016

(86) PCT No.: PCT/CN2016/095516
§ 371 (c)(1),
(2) Date: Jan. 15, 2018

(87) PCT Pub. No.: WO2017/032238
PCT Pub. Date: Mar. 2, 2017

(65) Prior Publication Data
US 2018/0212900 A1   Jul. 26, 2018

(30) Foreign Application Priority Data
Aug. 21, 2015   (CN) .......................... 2015 1 0519474

(51) Int. Cl.
*H04L 12/947* (2013.01)
*H04L 12/24* (2006.01)
(Continued)

(52) U.S. Cl.
CPC .......... *H04L 49/25* (2013.01); *H04L 41/0668* (2013.01); *H04L 41/12* (2013.01);
(Continued)

(58) Field of Classification Search
None
See application file for complete search history.

(56) References Cited

U.S. PATENT DOCUMENTS 7,218,608 B1 * 5/2007 Fang .................. H04L 12/5601
                                                       370/229
7,428,209 B1 * 9/2008 Roberts ............... H04L 41/0668
                                                       370/217
(Continued)

FOREIGN PATENT DOCUMENTS

CN         1642135 A     7/2005
CN       101098238 A     1/2008
(Continued)

OTHER PUBLICATIONS

ISA State Intellectual Property Office of the People's Republic of China, Written Opinion of the International Searching Authority Issued in Application No. PCT/CN2016/095516, dated Sep. 27, 2016, WIPO, 5 pages.

(Continued)

*Primary Examiner* — Steve R Young
(74) *Attorney, Agent, or Firm* — McCoy Russell LLP (57) ABSTRACT

In an example, a method of routing management is provided, wherein the method applied in a device for forwarding packet, which includes a main control board, fabric boards and line cards. The main control board may transmit routing entries to one or multiple fabric boards in the device according to a preset entry distribution strategy, transmit routing distribution information for indicating correspondence between each fabric board and a packet character of the routing entries stored in the fabric board to each of the line cards, so that the line card transmits a packet matching the packet character to a corresponding fabric board to be forwarded, according to the routing distribution information.

11 Claims, 5 Drawing Sheets

(51) Int. Cl.
*H04L 12/745* (2013.01)
*H04L 12/771* (2013.01)
*H04L 12/703* (2013.01)

(52) U.S. Cl.
CPC ............ *H04L 45/56* (2013.01); *H04L 45/748* (2013.01); *H04L 45/28* (2013.01)

(56) References Cited

U.S. PATENT DOCUMENTS

| | | | |
|---|---|---|---|
| 7,747,078 B2 * | 6/2010 | Kencl | G06F 21/564 |
| | | | 382/181 |
| 7,760,732 B2 * | 7/2010 | Bhargava | H04L 45/60 |
| | | | 370/392 |
| 8,625,624 B1 * | 1/2014 | Rose | H04L 47/6205 |
| | | | 370/414 |
| 8,705,551 B2 * | 4/2014 | Addanki | H04L 41/0659 |
| | | | 370/422 |
| 9,634,927 B1 * | 4/2017 | Singh | H04L 12/4641 |
| 2001/0037435 A1 | 11/2001 | Van Doren | |
| 2004/0085894 A1 * | 5/2004 | Wang | H04L 43/10 |
| | | | 370/216 |
| 2005/0074001 A1 | 4/2005 | Mattes et al. | |
| 2010/0165983 A1 | 7/2010 | Aybay et al. | |
| 2011/0122874 A1 * | 5/2011 | Pacella | H04L 45/00 |
| | | | 370/392 |
| 2012/0008633 A1 | 1/2012 | Kuramoto et al. | |
| 2012/0045206 A1 | 2/2012 | Sindhu | |
| 2012/0320930 A1 | 12/2012 | Singh et al. | |
| 2014/0036918 A1 | 2/2014 | Varvello et al. | |
| 2015/0124633 A1 * | 5/2015 | Banerjee | H04L 47/33 |
| | | | 370/252 |
| 2015/0295862 A1 * | 10/2015 | Banerjee | H04L 49/3009 |
| | | | 370/392 |

FOREIGN PATENT DOCUMENTS

| | | |
|---|---|---|
| CN | 101547147 A | 9/2009 |
| CN | 102273150 A | 12/2011 |
| CN | 102594699 A | 7/2012 |
| JP | 2004517519 A | 6/2004 |
| JP | 2012205300 A | 10/2012 |

OTHER PUBLICATIONS

European Patent Office, Office Action Issued in Application No. 16838497.2, dated Feb. 5, 2019, Germany, 7 pages.
Japanese Patent Office, Office Action Issued in Application No. 2018-509802, dated Feb. 26, 2019, 5 pages. (Submitted with Machine Translation).
European Patent Office, Extended European Search Report Issued in Application No. 16838497.2, dated Mar. 27, 2018, Germany, 9 pages.
State Intellectual Property Office of the People's Republic of China, Office Action and Search Report Issued in Application No. 201510519474.1, dated Apr. 3, 2019, 10 pages. (Submitted with Partial Translation).
ISA State Intellectual Property Office of the People's Republic of China, International Search Report Issued in Application No. PCT/CN2016/095516, dated Sep. 27, 2016, WIPO, 4 pages.
State Intellectual Property Office of the People's Republic of China, Office Action and Search Report Issued in Application No. 201510519474.1, dated Jan. 16, 2020, 18 pages. (Submitted with Partial Translation).

* cited by examiner

ROUTING MANAGEMENT

CROSS-REFERENCE TO RELATED APPLICATIONS

The present application is a U.S. National Phase of International Patent Application Serial No. PCT/CN2016/095516 entitled "ROUTE MANAGEMENT," filed on Aug. 16, 2016. International Patent Application Serial No. PCT/CN2016/095516 claims priority to Chinese Patent Application No. 201510519474.1, filed on Aug. 21, 2015. The entire contents of each of the above-cited applications are hereby incorporated by reference in their entirety for all purposes.

BACKGROUND

In a network, a device for forwarding packet such as a switch may perform packet forwarding according to each routing entry in a routing table. Due to the enlargement of the network, more and more routing entries may be required for forwarding packets within the network. In order to cope with the increased number of routing entries, the hardware resources may be enhanced, for example to expand the storage resources in the switches for storing more routing entries.

DETAILED DESCRIPTION OF THE EMBODIMENTS

Here the examples will be detailed in combination with the drawings. When the following description refers to the drawings, unless otherwise stated, the same reference signs in the different drawings illustrate the same or similar elements. The implementations described in the examples do not necessarily present all the exactly identical implementations of this application. They are merely the examples of certain aspects of this application, as detailed in the attached claims.

Figure 1:
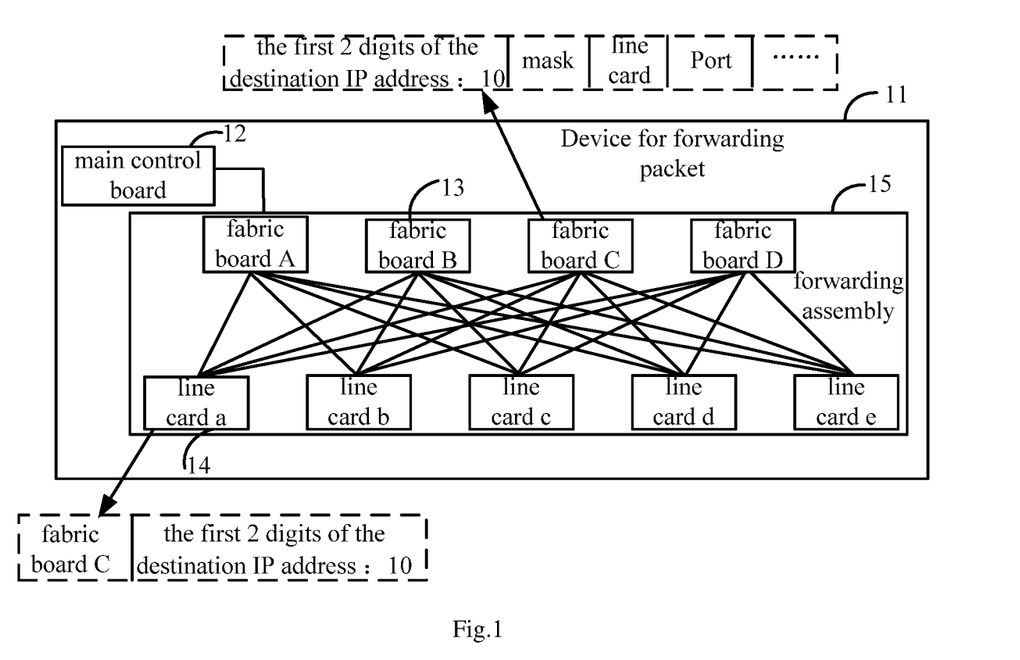
FIG. 1 illustrates a schematic diagram of the structure of a device for forwarding packet according to an example of this disclosure.

FIG. 1 illustrates a schematic diagram of the structure of a device for forwarding packet in an example of this disclosure. A device 11 for forwarding packet such as a switch may include main control board 12 and forwarding assembly 15, wherein, the forwarding assembly 15 may include multiple fabric boards 13 and line cards 14. Main control board 12 may be in a primary and standby form, and may manage and control the device 11 for forwarding packet in the whole. The forwarding assembly 15 may perform packet forwarding according to routing entries. Herein, a routing entry may include such as destination address, mask, output interface, next hop information of a packet. Fabric boards 13 may be used for high-speed forwarding of a packet between line cards 14. Line cards 14 may provide packet exchanging between local ports and egress network ports. Since packets are received and sent through line cards 14, line cards 14 may be regarded as input and output interfaces of the device 11 for forwarding packet. Each line card 14 may be connected with each fabric board 13, and each line card 14 may forward packets between each other via fabric boards 13. For example, if a packet enters through a port in a line card 14 of the device 11, and exits from a port in another line card 14, then the packet may be forwarded between the two line cards 14 via a fabric board 13.

Main control board 12 may acquire routing entries depending on which the device 11 may forward packets. The routing entries may be pre-configured and distributed to the main control board 12, or be determined by the main control board 12 according to a routing protocol. After acquiring the routing entries, the main control board 12 may distribute the routing entries to the forwarding assembly 15. The forwarding assembly 15 may perform packet forwarding according to the distributed routing entries, for example, from one line card 14 to another as described in the above.

According to a packet forwarding process within a commonly-used switch, routing entries may generally be distributed to line cards by the main control board. When packets are to be forwarded, it may be required to search line cards for the routing entries since the routing entries of the whole network are stored in line cards. When the number of the routing entries increases, the storage areas for storing the routing entries in line cards may be enhanced to satisfy the requirement, which may directly cause the increase of the storage capacity of the device. Thus, the hardware cost of the device may increase correspondingly. To solve such a problem, this disclosure provides a method for routing management. The method can store routing entries in multiple fabric boards dispersively so as to increase the routing table capacity of a device for forwarding packet, and avoid the large increase of the hardware cost of the device.

Figure 2:
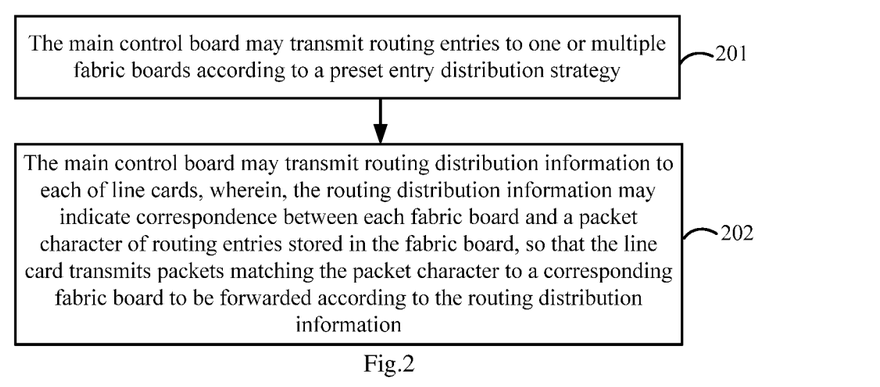
FIG. 2 illustrates a flow chart of a method for routing management according to an example of this disclosure.

FIG. 2 illustrates the process executed by the main control board according to the method for routing management in an example of this disclosure. The process may include blocks 201 to 202.

In block 201, the main control board may transmit routing entries to one or multiple fabric boards according to a preset entry distribution strategy.

In block 202, the main control board may transmit routing distribution information to each of line cards, wherein, the routing distribution information may indicate the correspondence between each fabric board and a packet character of the routing entries stored in the fabric board. Thus, the line cards may transmit packets matching the packet character to the fabric board corresponding to the packet character to be forwarded according to the routing distribution information.

For example, the main control board may save an entry distribution strategy set in advance, wherein, the strategy may be used for determining how the main control board to distribute routing entries to a forwarding assembly. As illustrated in FIG. 1, main control board 12 may distribute the routing entries to one or multiple fabric boards 13 respectively according to the entry distributing strategy set in advance, and the distributed routing entries may be dispersively stored on one or multiple fabric boards 13.

In this example, the main control board may categorize the routing entries to be distributed according to the packet character. Then the main control board may define to which fabric board each category of routing entries are distributed according to the entry distributing strategy set in advance. The entry categorizing principle may be various according to actual needs, and the following provides two exemplary principles.

In an example, the routing entries may be categorized according to the first 2 bits of the destination IP addresses included in the routing entries. Since the values of the first 2 bits may be 11, 10, 01 and 00 (binary values), the routing entries may be divided into 4 categories. Then, the correspondence between the values of the first 2 bits and each fabric board may be defined. For example, the routing entries with the values of the first 2 bits of the destination IP addresses as 00, may be distributed to fabric board A; the routing entries with the values of the first 2 bits of the destination IP addresses as 11, may be distributed to fabric board B, etc. According to this entry distribution strategy, routing entries may be transmitted to fabric boards corresponding to the first 2 bits of the destination IP addresses of the routing entries.

In another example, the routing entries may be categorized according to the network segments of the destination IP addresses included in the routing entries, i.e., the routing entries may be distributed according to the network segments of the destination IP addresses. According to this entry distribution strategy, the routing entries with different network segments of the destination IP addresses may be transmitted to the fabric boards corresponding to the network segments.

In the above two examples, the routing entries may be distributed to the corresponding fabric boards according to the prefixes of the destination IP addresses included in the routing entries. The prefix of the destination IP address may be termed as "packet character". The routing entries with different packet characters may be transmitted to one or multiple fabric boards respectively according to the entry distribution strategy. That is, the routing entries with different prefix of the destination IP address included in the routing entries may be transmitted to different fabric boards respectively.

Take FIG. 1 for instance, assume that the entry distribution strategy may be set on the main control board according to the requirements, the strategy may include:

the routing entries with the value of the first 2 bits of the destination IP address being "00", may be distributed to fabric board A;

the routing entries with the value of the first 2 bits of the destination IP address being "11", may be distributed to fabric board B;

the routing entries with the value of the first 2 bits of the destination IP address being "10", may be distributed to fabric board C;

the routing entries with the value of the first 2 bits of the destination IP address being "01", may be distributed to fabric board D.

Herein, a routing entry may include destination IP address, mask, egress line card, egress port, next hop MAC information. The main control board may acquire the value of the first 2 bits of the destination IP address in the routing entry, for instance being "10". According to the entry distribution strategy, the main control board may transmit the routing entry to fabric board C, and fabric board C may save the routing entry. Exemplarily, with reference to FIG. 1, the routing entries with the values of the first 2 bits of the destination IP addresses being "10" are stored on fabric board C, and certainly fabric board C may also save other entries, but FIG. 1 only demonstrate part of the entries.

In this example, "00", "11", "10" and "01" in the entry distribution may be called "preset packet character". With respect to the preset packet character "10", routing entries with the values of the first 2 bits of the destination IP addresses being "10" may be transmitted to fabric board C. The method for distributing routing entries according to the network segment of the destination IP address is similar, and will not be detailed.

Besides, when distributing routing entries, the main control board may not just categorize the routing entries with different packet characters, and transmit the different categories of routing entries to the corresponding fabric boards thereof as above. The main control board may also determine to which fabric boards some certain category of routing entries are to be transmitted, and how to distribute the category of routing entries among these determined fabric boards.

For example, with reference to FIG. 1, the device for forwarding packet may include 4 fabric boards, and the main control board may distribute routing entries to the 4 fabric boards, 3 fabric boards therein or so. That is, the main control board may distribute the routing entries to all of or part of the fabric boards.

With respect to one certain category of the routing entries, for instance, the routing entries with the values of the first 2 bits of the destination IP addresses being "01", may be distributed to a corresponding fabric board thereof, for example fabric board D. Or, such category of routing entries may be distributed to multiple fabric boards according to a preset ratio. The preset ratio may define the entry distribution among multiple fabric boards. For example, when there are 4 fabric boards, a ratio may be set as 2:1:1:2. The routing entries with the preset packet character that is "the value of the first 2 bits of the destination IP address: 01" may be dispersively stored to the 4 fabric boards according to the ratio of 2:1:1:2. In another example, assume that there are 8 fabric boards, and then the routing entries with the preset packet character being 01 may be dispersively stored to 6 of the 8 fabric boards according to a preset ratio of 1:3:1:2:1:1. The preset ratio is not restrictive, and may be defined according to specific conditions. The routing entries may also be dispersively stored to part of the fabric boards according to a preset ratio. Meanwhile, the routing entries with different packet characters may be grouped according to the preset ratio, and then each group of the routing entries may be transmitted to the fabric board corresponding to the group.

After distributing the routing entries to the fabric boards, the main control board may also transmit routing distribution information to the line cards. The routing distribution information may be used to inform the line cards which fabric board saves which routing entries. The routing distribution information may include: the correspondence between each fabric board and the packet character of the routing entries stored therein. With reference to table 1, it illustrates a record format for routing distribution information.

TABLE 1

| | Routing Distribution Information |
|---|---|
| fabric board A | the first two bits of the destination IP address: 00 |
| fabric board B | the first two bits of the destination IP address: 11 |
| fabric board C | the first two bits of the destination IP address: 10 |
| fabric board D | the first two bits of the destination IP address: 01 |

Table 1 as above, describes that the routing entries stored in each fabric board have different packet characters. Table 1 is merely exemplary but not restrictive. For example, the routing entries with the same packet character may be transmitted to different fabric boards according to a preset ratio, on the basis of a preset entry distribution strategy. In block 202, main control board may distribute the routing distribution information to each line card. Exemplarily, with reference to FIG. 1, the routing distribution information stored on line card a may include the correspondence between fabric board C and the packet character that is "the first two bits of the destination IP address: 10". The process executed by line card a according to the routing distribution information may include blocks 301 and 302, with reference to FIG. 3.

Figure 3:
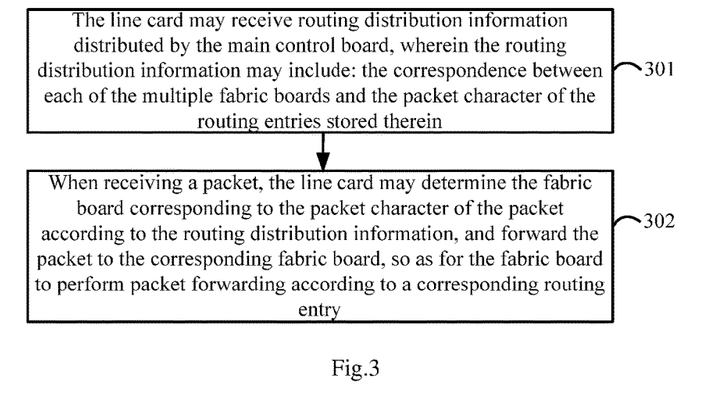
FIG. 3 illustrates a flow chart of a method for routing management according to another example of this disclosure.

In block 301, the line card may receive routing distribution information distributed by the main control board, wherein the routing distribution information may include: the correspondence between each of the multiple fabric boards and the packet character of the routing entries stored therein.

In block 302, when receiving a packet, the line card may determine the fabric board corresponding to the packet character of the packet according to the routing distribution information, and forward the packet to the corresponding fabric board, so as for the fabric board to perform packet forwarding according to a corresponding routing entry.

When receiving a packet of which value of the first 2 bits of the destination IP address is 01, the line card may determine that the packet is to be transmitted to fabric board D according to the routing distribution information illustrated in table 1. Then fabric board D may forward the packet by looking up a locally-stored forwarding table. That is, fabric board D may determine the line card and the port, through which the packet is forwarded out from the device for forwarding packet, by looking up routing entries with the packet character "01". The determined line card and port may be referred as exit line card and exit port through which the packet may be forwarded out from the device for forwarding packet. Then the packet may be transmitted to the exit line card, and forwarded out through the exit port of the exit line card.

With reference to FIG. 3, when receiving the packet, the line card may forward the packet to the fabric board, according to the routing distribution information distributed by the main control board, and then the fabric board may forward the packet according to the routing entries. For example, FIG. 4 illustrates a packet forwarding scenario, in which it is assumed that host 1 may forward packet to host 2, and the process is as illustrated by FIG. 5.

In block 501, a line card of a device for forwarding packet may receive a packet.

Figure 4:
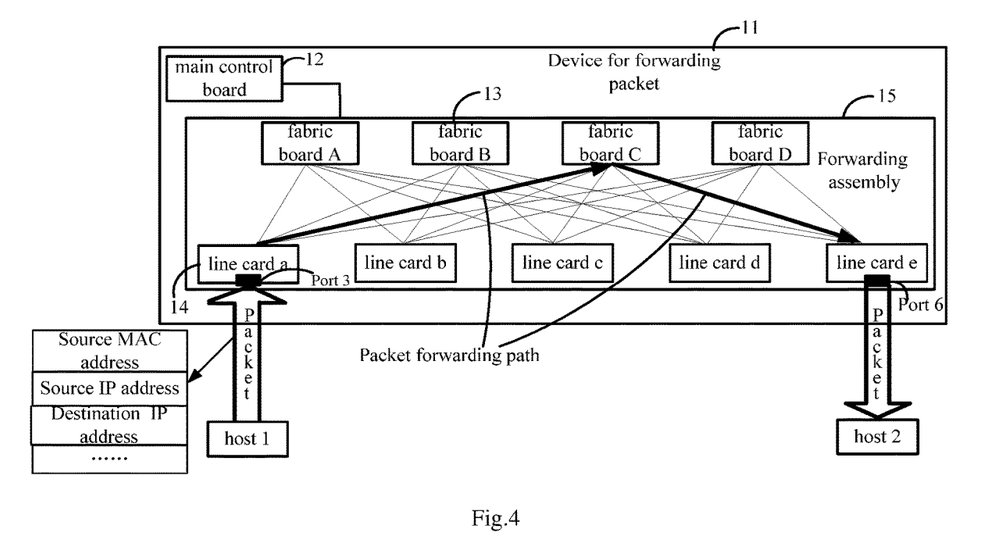
FIG. 4 illustrates a packet forwarding scenario according to an example of this disclosure.
Figure 5:
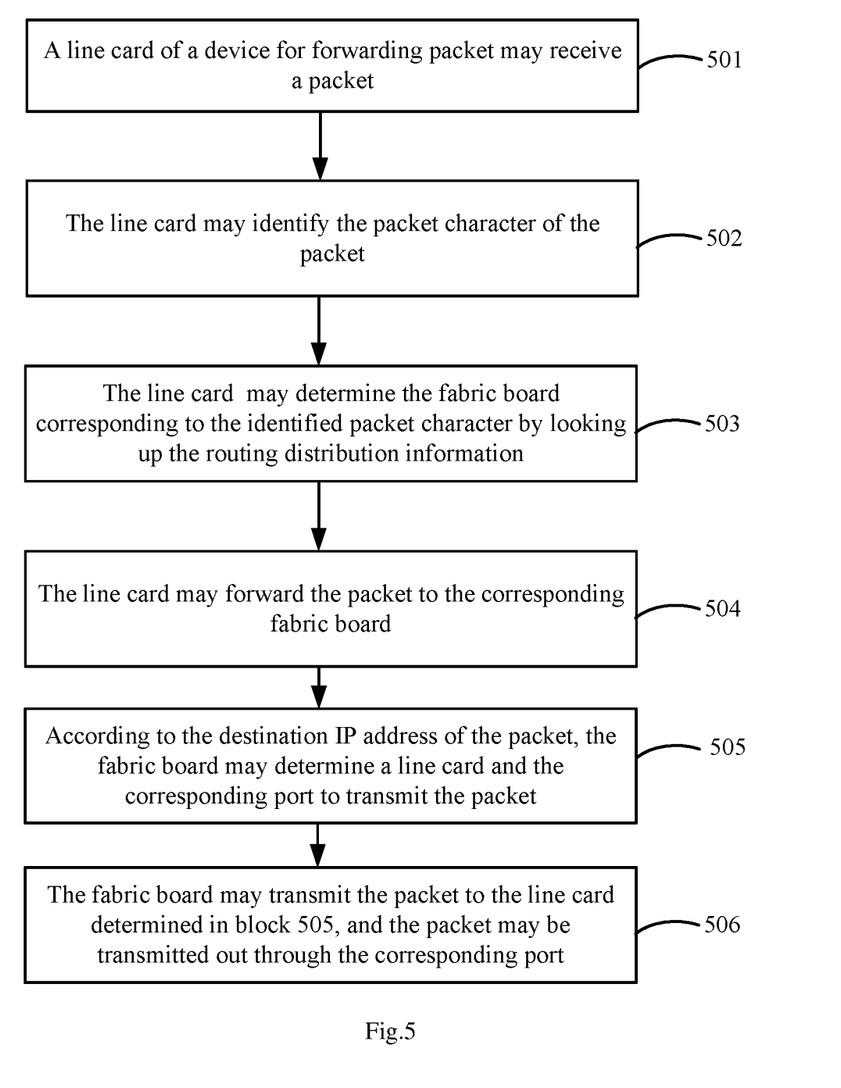
FIG. 5 illustrates a flow chart of a method for routing management according to another example of this disclosure.

As illustrated by FIG. 4, line card a may receive a packet transmitted from host 1 through port 3.

Therein, the packet character of the packet may have multiple formats. For example, the MAC address and IP address of the source device, and the destination IP address of the destination device, and so on, all may be used as the packet characters.

In block 502, the line card may identify the packet character of the packet.

In an example, the first 2 bits of the destination IP address being the packet character, line card a may acquire the destination IP address of the packet from the packet, and in turn acquire the value of the first two bits of the destination IP address. And assume that the acquired value is 10, that is to say, the packet character identified by the line card a is "the first two bits of the destination IP address: 10".

In block 503, the line card may determine the fabric board corresponding to the identified packet character by looking up the routing distribution information.

Line card a may look up the routing distribution information distributed by the main control board which is stored in line card a, and the routing distribution information may have the format as table 1; and line card a may determine that the fabric board corresponding to the first 2 bits of the destination IP address being 10 is fabric board C.

In block 504, the line card may forward the packet to the corresponding fabric board.

After determining that the fabric board corresponding to the first 2 bits of the destination IP address being 10 is fabric board C, as shown in FIG. 4, line card a may transmit the packet to fabric board C.

In block 505, according to the destination IP address of the packet, the fabric board may determine a line card and the corresponding port to transmit the packet.

The routing entries stored on fabric board C corresponding to the first 2 bits of the destination IP address being 10, may be multiple. As table 2 illustrates, fabric board C may save n entries, all having the packet character "10".

TABLE 2

| | | routing entries stored in fabric board | | | |
|---|---|---|---|---|---|
| Fabric board C | Destination IP address 1 | Mask 1 | Egress line card a | Egress port 4 | Next hop MAC 1 |
| | Destination IP address 2 | Mask 2 | Egress line card e | Egress port 6 | Next hop MAC 2 |
| | ... | ... | ... | ... | ... |
| | Destination IP address n | Mask n | Egress line card n | Egress port 5 | Next hop MAC n |

In this block, fabric board may check each routing entry stored therein according to the destination IP address in the packet. It is assumed that the fabric board may determine the line card corresponding to the destination IP address is line card e, and further determine the corresponding port is port 6 of line card e. That is to say, the packet may be transmitted out from the device for forwarding packet through port 6 of line card e to arrive at destination host 2.

In block 506, fabric board may transmit the packet to the line card determined in block 505, and the packet may be transmitted out through the corresponding port.

As illustrated by FIG. 4, fabric board C may transmit the packet to line card e, and the packet may be transmitted out through port 6 of line card e, then the packet forwarding process of the device for forwarding packet is completed.

Besides, in case that one packet character corresponds to multiple fabric boards, for example, the routing entries with the value of the first 2 bits of the destination IP address being "10" may be stored in four fabric boards dispersively according to a preset ratio, a line card may transmit the packet to the four fabric boards. Then each fabric board may determine if there is any routing entry corresponding to the IP address stored therein or not according to the specific IP address.

If one of the fabric boards malfunctions, then when having detected the malfunctioning fabric board, the main control board may forward the routing entries stored in the malfunctioning fabric board to other fabric boards, to continue with routing forwarding. For example, when fabric board C malfunctions, the main control board may distribute each routing entry stored in fabric board C and with the packet character that is "first 2 bits of destination IP: 10" to fabric board D. Meanwhile, the main control board may update the routing distribution information and inform each line card the updated routing distribution information. Each line card may be informed that, the fabric board which corresponds to the routing entries with the packet character that is "first 2 bits of destination IP: 10" is transferred from fabric board C to fabric board D.

When forwarding the routing entries to other fabric boards, other than that the routing entries may be distributed to one other fabric board as described above, the routing entries may also be distributed to two or multiple fabric boards according to the strategy defined by users. For example, users may set that: when fabric board C malfunctions, the routing entries on fabric board C may be distributed to fabric board D, or the routing entries on fabric board C may be distributed to fabric board D and fabric board A dispersively according to a preset ratio.

When a few default routing entries exist in network, the main control board may distribute the default routing entries to each fabric board, so all fabric boards may execute the default routing entries. The default routing entries may be a special type of static routing, and may indicate the routing selection made by the device for forwarding packet when no entry in the routing table matches the destination address of the packet.

According to the method for routing management in the disclosure, the routing entries to be distributed may be dispersively transmitted by the main control board to each fabric board to be saved. Each fabric board may forward packet according to the routing entries stored therein. In this way, the cost of each fabric board for storing routing entries may be reduced. Additionally, the routing table capacity of the device for forwarding packet may be effectively expanded, and the incremental hardware cost of the device for forwarding packet may be avoided.

Figure 6:
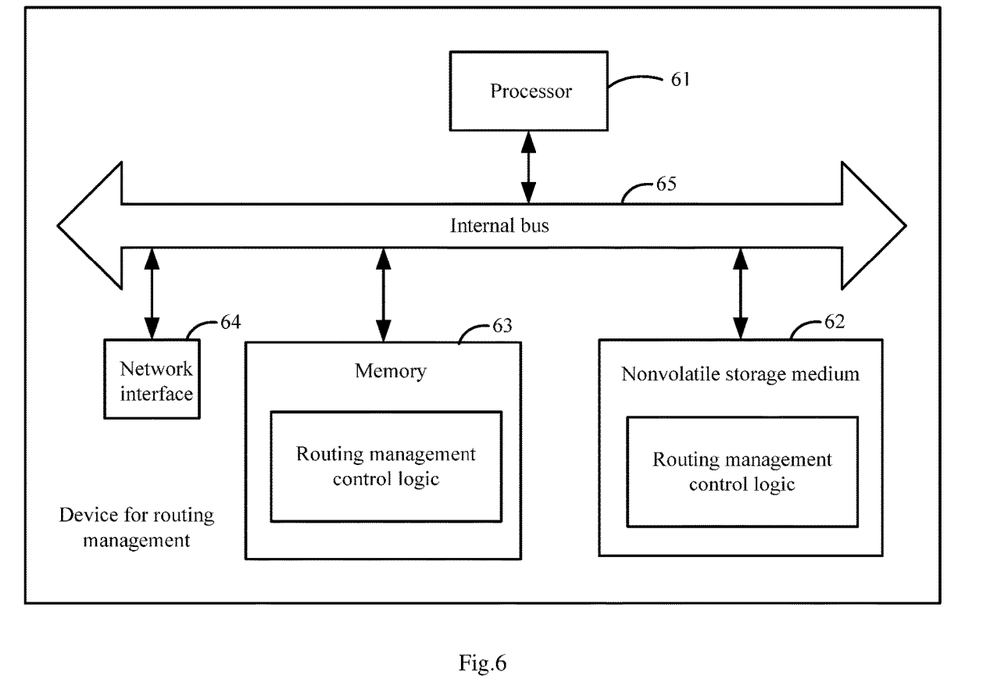
FIG. 6 illustrates a block diagram of a hardware structure of a device for routing management according to an example of this disclosure.

With reference to FIG. 6, it illustrates a structure diagram of the main control board and line card in the disclosure. The main control board and line card may be realized by software, or realized by hardware or combination of software and hardware. As illustrated by FIG. 6, the device for routing management such as main control board and line card may comprise: processor 61, nonvolatile storage medium 62, memory 63 and network interface 64, wherein, the above components may communicate with each other via internal bus 65. For example, the processor 61 may read out the commands corresponding to the routing management control logic in the nonvolatile storage medium 62 to memory 63 to execute, so as for the device to execute the method for routing management in the disclosure.

For example, when the device for routing management is the main control board, the main control board may execute the process indicated in FIG. 2 through executing the instructions corresponding to the routing management control logic; when the device for routing management is the line card, the line card may execute the process indicated in FIG. 3 through executing the instructions corresponding to the routing management control logic. But, since the methods for routing management executed respectively by the main control board and line card are different, so the instructions corresponding to the routing management control logic executed respectively by the two are different. The instructions corresponding to the routing management control logic executed by the main control board and the line card are detailed as follows, and hereinafter, the instructions corresponding to the control logic may be referred to as "routing management control logic".

Figure 7:
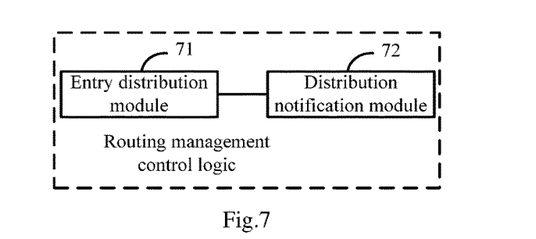
FIG. 7 illustrates a block diagram of function modules of a control logic for routing management according to an example of this disclosure.

FIG. 7 illustrates the function modules or units for routing management control logic of the main control board, wherein the implementation process of the function and role of each module or unit, may be referred to the corresponding blocks in the above method, and will not be detailed. As illustrated in FIG. 7, the routing management control logic for the main control board may functionally comprise entry distribution module 71 and distribution notification module 72, wherein, entry distribution module 71 may be used for transmitting the routing entries to one or multiple fabric boards respectively according to a preset entry distribution strategy;

distribution notification module 72 may be used for transmitting the routing distribution information for indicating correspondence between each fabric board and a packet character of routing entries stored in the fabric board to each of the line cards, so that the line card transmits a packet matching the packet character to a corresponding fabric board to be forwarded, according to the routing distribution information.

Further, when transmitting the routing entries to one or multiple fabric boards respectively according to a preset entry distribution strategy, entry distribution module 71 may categorize the routing entries according to a packet character; and transmit each category of the routing entries to the one or multiple fabric boards according to the preset entry distribution strategy.

In another example, when transmitting the routing entries to one or multiple fabric boards according to a preset entry distribution strategy, table distribution module 71 may group the routing entries according to a preset ratio for defining distribution of the routing entries among the one or multiple fabric boards; and transmit each group of the routing entries to the fabric board corresponding to the group according to the preset entry distribution strategy.

Furthermore, when having detected a malfunctioning fabric board, table distribution module 71 may forward the routing entries stored in the malfunctioning fabric board to another fabric board, and update the routing distribution information; distribution notification module 72 may be used for transmitting the updated routing distribution information to each of the line cards.

For example, the packet character of routing entries stored in the fabric boards may include a prefix of the destination IP address of a packet. The prefix of the destination IP address may include the first two bits of the destination IP address or the network segment of the destination IP address.

Figure 8:
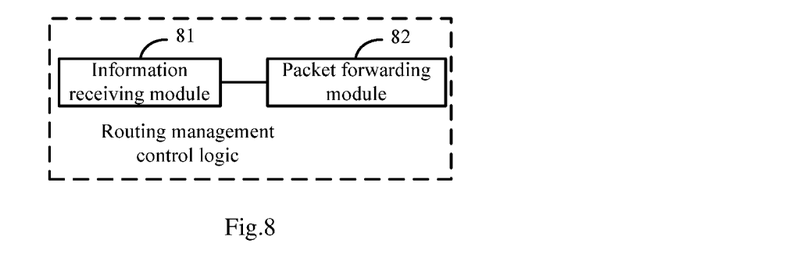
FIG. 8 illustrates a block diagram of function modules of a control logic for routing management according to another example of this disclosure.

FIG. 8 illustrates the function modules or units for routing management control logic of the line card, wherein the implementation process of the function and role of each module or unit, may be referred to the corresponding blocks in the above method, and will not be detailed. As illustrated in FIG. 8, the routing management control logic for the line card may functionally comprise information receiving module 81 and packet forwarding module 82, wherein, information receiving module 81 may be used for receiving routing distribution information transmitted by the main control board, which includes correspondence between each fabric board and a packet character of the routing entries stored in the fabric board;

packet forwarding module 82 may be used for forwarding a packet matching the packet character to a corresponding fabric board according to the routing distribution information when the packet is received, so that the fabric board forwards the packet according to a corresponding routing entry.

Figure 9:
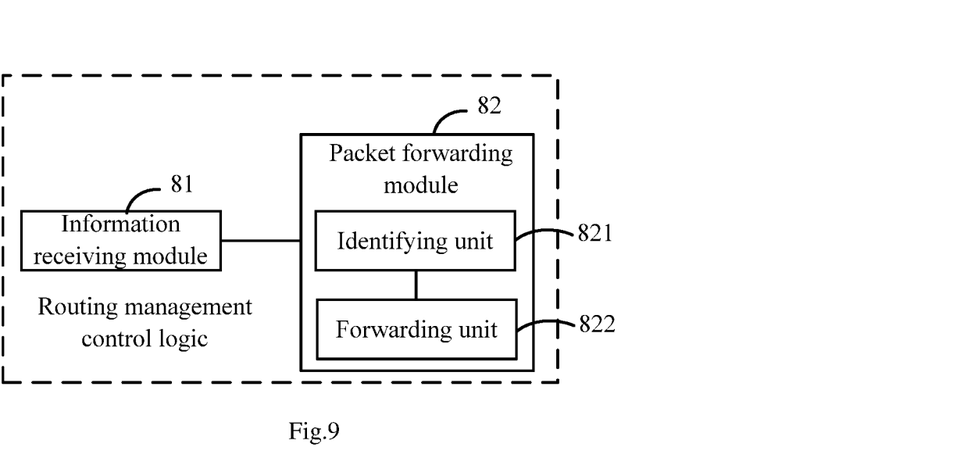
FIG. 9 illustrates a block diagram of function modules of a control logic for routing management according to another example of this disclosure.

For example, with reference to FIG. 9, packet forwarding module 82 may include identifying unit 821 and forwarding unit 822; wherein, the identifying unit 821 may be used for identifying the packet character of the packet;

forwarding unit 822 may be used for determining the fabric board corresponding to the identified packet character by looking up the routing distribution information, and forwarding the packet to the determined fabric board.

If the above functions are achieved in the form of software function units, a machine readable storage medium storing a program which includes the software function units can be used as an independent product for sale. Based on such understanding, the technical solution of the disclosure is essentially or the part of the disclosure that contributes to the prior art or part of the technical solution can be embodied as in a format of a software product, and the software product may be stored in a storage medium, including several instructions used to cause a computer device (for example, PC, server, or network device and so on) to execute all of or part of the blocks of the method in the examples of the disclosure. The above mentioned storage medium may include USB disc, mobile hard disk drive, ROM (Read-Only Memory), RAM (Random Access Memory), disc, optic disc, or other various kinds of storage mediums which can store program codes, and so on.

The foregoing disclosure is merely illustrative of preferred examples of the disclosure but are not intended to limit the disclosure, and any modifications, equivalent substitutions, adaptations, thereof made without departing from the spirit and scope of the disclosure shall be encompassed in the claimed scope of the appended claims.

The invention claimed is:

1. A method for routing management, wherein the method is applied in a device for forwarding packet, which includes a main control board, fabric boards and line cards, the method includes:

transmitting, by the main control board, routing entries to one or multiple fabric boards in the device for forwarding packet respectively according to a preset entry distribution strategy;

transmitting, by the main control board, routing distribution information for indicating correspondence between each fabric board and a packet character of routing entries stored in the fabric board to each of the line cards, so that a line card transmits a packet matching the packet character to a corresponding fabric board to be forwarded, according to the routing distribution information;

wherein, the corresponding fabric board looks up the routing entries based on a destination IP address of the packet and determines an egress line card of the line cards and a corresponding egress port on the egress line card to forward the packet, and wherein said transmitting routing entries to one or multiple fabric boards in the device for forwarding packet respectively according to a preset entry distribution strategy, includes:

categorizing, by the main control board, the routing entries according to the packet character; and transmitting, by the main control board, each category of the routing entries to the one or multiple fabric boards according to the preset entry distribution strategy, wherein when having detected a malfunctioning fabric board, the method further includes:

forwarding, by the main control board, routing entries stored in the malfunctioning fabric board to another fabric board, updating, by the main control board, the routing distribution information, and transmitting, by the main control board, the updated routing distribution information to each of the line cards.

2. The method according to claim 1, wherein, said transmitting each category of the routing entries to the one or multiple fabric boards according to the preset entry distribution strategy, includes:

grouping, by the main control board, each category of the routing entries according to a preset ratio for defining distribution of the routing entries among the one or multiple fabric boards; and transmitting, by the main control board, each group of the routing entries to the fabric board corresponding to the group according to the preset entry distribution strategy.

3. The method according to claim 1, wherein, the packet character of the routing entries stored in each of the fabric boards includes a prefix of destination IP address of a packet.

4. The method according to claim 3, wherein the prefix of the destination IP address of the packet includes first two bits of the destination IP address or a network segment of the destination IP address.

5. A method for routing management, wherein the method is applied in a device for forwarding packet, which includes a main control board, fabric boards and line cards, the method includes:

receiving, by a line card, routing distribution information transmitted by the main control board, wherein, the routing distribution information includes correspondence between each fabric board and a packet character of routing entries stored in the fabric board, and wherein, routing entries are categorized by the main control board according to the packet character and each category of the routing entries are transmitted to one or multiple fabric boards according to a preset entry distribution strategy;

forwarding, by the line card, a packet matching the packet character to a corresponding fabric board according to the routing distribution information when the packet is received, so that the fabric board looks up the routing entries based on a destination IP address of the packet and determines an egress line card of the line cards and a corresponding egress port on the egress line card to forward the packet according to a corresponding routing entry, wherein, in response to having detected a malfunctioning fabric board, the main control board forwards routing entries stored in the malfunctioning fabric board to another fabric board, updates the routing distribution information, and transmits the updated routing distribution information to each of the line cards.

6. The method according to claim 5, wherein forwarding the packet matching the packet character to the corresponding fabric board according to the routing distribution information, includes:

identifying, by the line card, the packet character of the packet;

determining, by the line card, the fabric board corresponding to the identified packet character by looking up the routing distribution information; and forwarding, by the line card, the packet to the determined fabric board.

7. A device for routing management, including a processor and a non-transitory storage medium with machine executable instructions corresponding to a routing management control logic which is applied in a main control board in a device for forwarding packet, wherein, by executing the machine executable instructions, the processor is caused to:

transmit routing entries to one or multiple fabric boards in the device for forwarding packet respectively according to a preset entry distribution strategy;

transmit routing distribution information for indicating correspondence between each fabric board and a packet character of routing entries stored in the fabric board to each of the line cards in the device for forwarding packet, so that a line card transmits a packet matching the packet character to a corresponding fabric board to be forwarded, according to the routing distribution information;

wherein, the corresponding fabric board looks up the routing entries based on a destination IP address of the packet and determines an egress line card of the line cards and a corresponding egress port on the egress line card to forward the packet, wherein, when transmitting the routing entries to the one or multiple fabric boards in the device for forwarding packet respectively according to the preset entry distribution strategy, the machine executable instructions further cause the processor to:

categorize the routing entries according to the packet character; and transmit each category of the routing entries to the one or multiple fabric boards according to the preset entry distribution strategy, wherein, when having detected a malfunctioning fabric board, the machine executable instructions further cause the processor to:

forward routing entries stored in the malfunctioning fabric board to another fabric board;

update the routing distribution information; and transmit the updated routing distribution information to each of the line cards.

8. The device according to claim 7, wherein, when transmitting each category of the routing entries to the one or multiple fabric boards respectively according to the preset entry distribution strategy, the machine executable instructions further cause the processor to:

group each category of the routing entries according to a preset ratio for defining distribution of the routing entries among the one or multiple fabric boards; and transmit each group of the routing entries to the fabric board corresponding to the group according to the preset entry distribution strategy.

9. The device according to claim 7, wherein, the packet character of the routing entries stored in each of the fabric boards includes a prefix of destination IP address of a packet, and wherein, the prefix of the destination IP address of the packet includes first two bits of the destination IP address or a network segment of the destination IP address.

10. A device for routing management, including a processor and a non-transitory storage medium with machine executable instructions corresponding to a routing administrating control logic which is applied in a line card in a device for forwarding packet, wherein, by executing the machine executable instructions, the processor is caused to:

receive routing distribution information transmitted by a main control board in the device for forwarding packet, wherein, the routing distribution information includes correspondence between each fabric board in the device for forwarding packet and a packet character of routing entries stored in the fabric board, and wherein, routing entries are categorized by the main control board according to the packet character and each category of the routing entries are transmitted to one or multiple fabric boards according to a preset entry distribution strategy;

forward a packet matching the packet character to a corresponding fabric board according to the routing distribution information when the packet is received, so that the fabric board looks up the routing entries based on a destination IP address of the packet and determines an egress line card of the line cards and a corresponding egress port on the egress line card to forward the packet according to a corresponding routing entry, wherein, in response to having detected a malfunctioning fabric board, the main control board forwards routing entries stored in the malfunctioning fabric board to another fabric board, updates the routing distribution information, and transmits the updated routing distribution information to each line card.

11. The device according to claim 10, wherein, when forwarding the packet matching the packet character to the corresponding fabric board according to the routing distribution information, the machine executable instructions further cause the processor to:

identify the packet character of the packet;

determine the fabric board corresponding to the identified packet character by looking up the routing distribution information; and forward the packet to the determined fabric board.

* * * * *